(12) United States Patent
McLean

(10) Patent No.: US 8,402,434 B2
(45) Date of Patent: Mar. 19, 2013

(54) GRAPHICAL USER INTERFACE (GUI) SCRIPT GENERATION AND DOCUMENTATION

(75) Inventor: Alan John McLean, Greenbank (CA)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 12/255,457

(22) Filed: Oct. 21, 2008

(65) Prior Publication Data

US 2009/0044110 A1   Feb. 12, 2009

Related U.S. Application Data

(62) Division of application No. 10/860,413, filed on Jun. 3, 2004, now Pat. No. 7,461,342.

(30) Foreign Application Priority Data

Dec. 29, 2003 (CA) ..................................... 2454290

(51) Int. Cl.
*G06F 9/44* (2006.01)
*G06F 9/45* (2006.01)

(52) U.S. Cl. ......... 717/115; 717/109; 717/124; 717/136

(58) Field of Classification Search ................ None
See application file for complete search history.

(56) References Cited

U.S. PATENT DOCUMENTS

| | | |
|---|---|---|
| 5,600,780 A | 2/1997 | Hiraga et al. |
| 5,790,117 A | 8/1998 | Halviatti et al. |
| 6,157,733 A | 12/2000 | Swain |
| 6,205,575 B1 | 3/2001 | Sherman et al. |
| 6,356,867 B1 | 3/2002 | Gabai et al. |
| 6,442,571 B1 | 8/2002 | Haff et al. |
| 6,502,102 B1 | 12/2002 | Haswell et al. |
| 6,546,558 B1 | 4/2003 | Taguchi |
| 6,587,556 B1 | 7/2003 | Judkins et al. |
| 6,595,046 B2 | 7/2003 | Lemberger et al. |
| 6,867,583 B2 | 3/2005 | Mizutani et al. |
| 6,931,632 B2 | 8/2005 | Ramasamy et al. |
| 6,938,261 B2 | 8/2005 | Camara et al. |
| 6,981,242 B2 | 12/2005 | Lehmeier et al. |
| 6,993,748 B2 | 1/2006 | Schaefer |
| 7,117,229 B2 | 10/2006 | Marshall et al. |
| 7,120,897 B2 | 10/2006 | Ebbo et al. |
| 7,124,401 B2 * | 10/2006 | Muller et al. .................. 717/124 |
| 7,278,158 B2 | 10/2007 | Peretti |
| 7,295,953 B2 | 11/2007 | Cox et al. |
| 7,313,564 B2 | 12/2007 | Melamed et al. |

(Continued)

OTHER PUBLICATIONS

Rodrigues et al., Using a script model to preserve the consistency within an UI design environment, Sep. 2005, 7 pages, <http://delivery.acm.org/10.1145/1130000/1122963/p143-rodrigues.pdf>.*

(Continued)

*Primary Examiner* — Thuy Dao
(74) *Attorney, Agent, or Firm* — Yee & Associates, P.C.; David A. Mims, Jr.

(57) ABSTRACT

There is disclosed a method and system for generating documentation for a GUI usage scenario. There is also disclosed a method and system for assembling a GUI script from a plurality of pre-scripted parts. In an embodiment, shadow objects are created to listen to and report activities of each GUI object of interest during a GUI usage session. The shadow objects may listen to shadowed GUI object activities during playback of the GUI script, or during a live GUI usage session. GUI object activities reported by the shadow objects are identified and converted into narrative language statements, using a pre-determined conversion list, to create human-readable documentation.

13 Claims, 14 Drawing Sheets

U.S. PATENT DOCUMENTS

| | | | |
|---|---|---|---|
| 7,340,691 B2 | 3/2008 | Bassett et al. | |
| 7,461,342 B2 | 12/2008 | McLean | |
| 7,624,337 B2 | 11/2009 | Sull et al. | |
| 7,703,005 B2* | 4/2010 | Felts | 715/234 |
| 7,712,074 B2 | 5/2010 | Ren | |
| 7,761,842 B2* | 7/2010 | Udler | 717/106 |
| 7,797,677 B1* | 9/2010 | Ballagh et al. | 717/115 |
| 7,934,158 B2 | 4/2011 | McLean | |
| 8,056,054 B2* | 11/2011 | Chen et al. | 717/115 |
| 2002/0059474 A1 | 5/2002 | Camara et al. | |
| 2002/0133504 A1 | 9/2002 | Vlahos et al. | |
| 2002/0133711 A1 | 9/2002 | Peretti | |
| 2002/0194393 A1 | 12/2002 | Hrischuk et al. | |
| 2002/0196280 A1 | 12/2002 | Bassett et al. | |
| 2003/0005171 A1 | 1/2003 | Schaeffer | |
| 2003/0023584 A1 | 1/2003 | Brandin | |
| 2003/0025728 A1 | 2/2003 | Ebbo et al. | |
| 2003/0046123 A1 | 3/2003 | Chen | |
| 2003/0046199 A1 | 3/2003 | Murase et al. | |
| 2003/0052917 A1* | 3/2003 | Dubovsky | 345/764 |
| 2003/0061225 A1 | 3/2003 | Bowman et al. | |
| 2003/0084429 A1 | 5/2003 | Schaefer | |
| 2003/0088862 A1 | 5/2003 | Ramasamy et al. | |
| 2003/0093500 A1 | 5/2003 | Khodabakchian et al. | |
| 2003/0097640 A1 | 5/2003 | Abrams et al. | |
| 2003/0120463 A1 | 6/2003 | Cox et al. | |
| 2003/0121024 A1 | 6/2003 | Hill et al. | |
| 2003/0132970 A1 | 7/2003 | Lehmeier et al. | |
| 2003/0135478 A1 | 7/2003 | Marshall et al. | |
| 2003/0236775 A1* | 12/2003 | Patterson | 707/3 |
| 2004/0041827 A1 | 3/2004 | Bischof et al. | |
| 2004/0044494 A1* | 3/2004 | Muller et al. | 702/123 |
| 2004/0044992 A1* | 3/2004 | Muller et al. | 717/124 |
| 2004/0100502 A1 | 5/2004 | Ren | |
| 2004/0107415 A1 | 6/2004 | Melamed et al. | |
| 2005/0144595 A1* | 6/2005 | McLean | 717/136 |
| 2007/0234284 A1* | 10/2007 | Tanner et al. | 717/109 |
| 2009/0037814 A1 | 2/2009 | McLean | |
| 2009/0083707 A1* | 3/2009 | Fujita et al. | 717/115 |
| 2009/0217250 A1* | 8/2009 | Grechanik et al. | 717/136 |
| 2011/0016453 A1* | 1/2011 | Grechanik et al. | 717/125 |

OTHER PUBLICATIONS

IBM, Web GUI Administration and User's Guide, 2009, 316 pages, <http://publib.boulder.ibm.com/infocenter/tivihelp/v8r1/topic/com.ibm.netcool_OMNIbus.doc_7.3.0/web_pdf>.*

USPTO Office Action regarding U.S. Appl. No. 10/860,413, dated Jan. 8, 2008, 13 pages.

USPTO Response to Office Action regarding U.S. Appl. No. 10/860,413, dated Apr. 4, 2008, 18 pages.

USPTO Notice of Allowance regarding U.S. Appl. No. 10/860,413, dated Jul. 14, 2008, 7 pages.

USPTO Amendment under Section 1.312 regarding U.S. Appl. No. 10/860,413, dated Oct. 10, 2008, 4 pages.

USPTO Terminal Disclaimer regarding U.S. Appl. No. 12/253,731, dated Oct. 17, 2008, 2 pages.

USPTO Response to Office regarding U.S. Appl. No. 12/253,731, dated Mar. 8, 2010, 14 pages.

USPTO Examiner's Interview Summary regarding U.S. Appl. No. 12/253,731, dated Aug. 12, 2010, 4 pages.

USPTO Amendment Pursuant to Request for Continued Prosecution regarding U.S. Appl. No. 12/253,731, dated Sep. 10, 2010, 18 pages.

USPTO Terminal Disclaimer regarding U.S. Appl. No. 12/253,731, dated Nov. 5, 2010, 2 pages.

USPTO Response to Office Action regarding U.S. Appl. No. 12/253,731, dated Dec. 14, 2010, 2 pages.

USPTO Office Action for U.S. Appl. No. 12/253,731 dated Dec. 11, 2009.

USPTO Final Office Action for U.S. Appl. No. 12/253,731 Dated Jun. 11, 2010.

USPTO Office Action for U.S. Appl. No. 12/253,731 Dated Oct. 28, 2010.

USPTO Notice of Allowance for U.S. Appl. No. 12/253,731 Dated Dec. 22, 2010.

Eisenhauer et al, "An Object Based Infrastructure for Program Monitoring and Steering", The 2nd Sigmetrics Symposium on Parallel and Distributed Tools (SPDT 98), Aug. 1998, pp. 2-3.

* cited by examiner

```
230    import resources.PopupTest1Helper;

231    import com.rational.test.ft.*;
232    import com.rational.test.ft.object.interfaces.*;
233    import com.rational.test.ft.script.*;
234    import com.rational.test.ft.value.*;
235    import com.rational.test.ft.vp.*;

236    public class PopupTest1 extends PopupTest1Helper
237    {
238        public void testMain (Object[] args)
239        {
240        TreeTree().click(RIGHT, atPath("SomeProject->src->com.example->MyFile.java"));

241        ContextMenuPopupMenu().click(atPath("Open"));
242        }
243    }
```

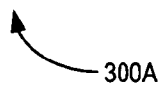

FIG. 3A

```
230    import resources.PopupTest1Helper;

231    import com.rational.test.ft.*;
232    import com.rational.test.ft.object.interfaces.*;
233    import com.rational.test.ft.script.*;
234    import com.rational.test.ft.value.*;
235    import com.rational.test.ft.vp.*;

236a   public class PopupTest1 extends PopupTest1Helper
237    {
238        public void testMain (Object[] args)
239        {
240n       callScript("OpenFile", new String[]{"SomeProject", "src", "com.example", "MyFile.java"});

242        }
243    }
```

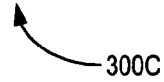

FIG. 3C

```
230    import resources.OpenFileHelper;

231    import com.rational.test.ft.*;
232    import com.rational.test.ft.object.interfaces.*;
233    import com.rational.test.ft.script.*;
234    import com.rational.test.ft.value.*;
235    import com.rational.test.ft.vp.*;

236    public class OpenFile extends OpenFileHelper
237    {
238            public void testMain (Object[] args)
239            {
240a                String projectName = (String)args[0];
240b                String projectFolder = (String)args[1];
240c                String packageName = (String)args[2];
240d                String fileName = (String)args[3];
240e                String separator = "->";

240f                String fullPath = projectName+separator;
240g                if (projectFolder != null)
240h                    fullPath += projectFolder+separator;

240i                if (packageName != null)
240j                    fullPath += packageName+separator;

240k                fullPath += fileName;

240m           TreeTree().click(RIGHT, atPath(fullPath));

241            ContextMenuPopupMenu().click(atPath("Open"));
242            }
243    }
```

FIG. 3B

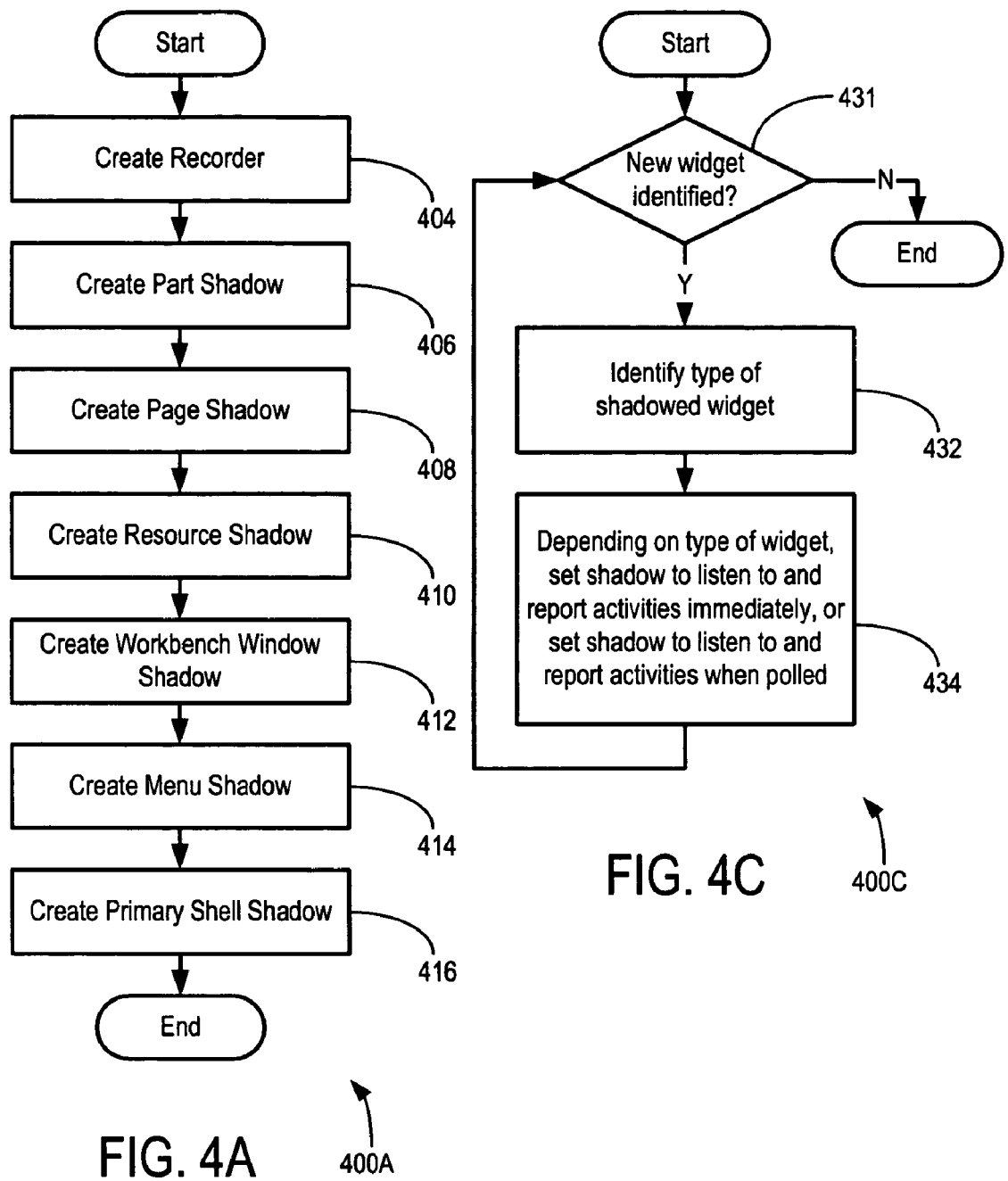

```
501  <message><key>%B_start_sequence</key><0>ID59</0></message>
502  <message><key>%B_From_the_menu_select</key><0>ID67</0><1>File > New > Service Project</1></message>
503  <message><key>%B_DEBUG</key><0>ID68</0><1>activate() for 1069444718763 (438 x 500) [438 x 500]</1></message>
504  <message><key>%B_DEBUG</key><0>ID69</0><1>Shell activated: 1069444718763 (438 x 500) [438 x 500]</1></message>
505  <message><key>%B_The_window_opens</key><0>ID70</0><1>New Project</1></message>
506  <message><key>%B_The_page_opens</key><0>ID71</0><1>Project name:</1></message>
507  <message><key>%B_Set_field_value</key><0>ID72</0><1>Project name</1><2>MyServiceProject</2></message>
508  <message><key>%B_Field_set_to</key><0>ID73</0><1>Directory</1><2><i>Workspace/</i>MyServiceProject</2></message>
509  <message><key>%B_Click_button</key><0>ID74</0><1>Next</1></message>
510  <message><key>%B_Field_set_to</key><0>ID75</0><1>Default output folder</1><2>MyServiceProject</2></message>
511  <message><key>%B_Click_button</key><0>ID76</0><1>Add Folder</1></message>
512  <message><key>%B_DEBUG</key><0>ID77</0><1>activate() for 1069444730931 (287 x 154) [287 x 154]</1></message>
513  <message><key>%B_DEBUG</key><0>ID78</0><1>Shell activated: 1069444730931 (287 x 154) [287 x 154]</1></message>
514  <message><key>%B_The_window_opens</key><0>ID79</0><1>New Source Folder</1></message>
515  <message><key>%B_Set_field_value</key><0>ID80</0><1>Enter a path relative to '/MyServiceProject'</1><2>src</2></message>
516  <message><key>%B_Click_button</key><0>ID81</0><1>OK</1></message>
517  <message><key>%B_DEBUG</key><0>ID82</0><1>widgetDisposed: 1069444730931 (287 x 154) [287 x 154]</1></message>
518  <message><key>%B_The_window_closes</key><0>ID83</0><1>New Source Folder</1></message>
519  <message><key>%B_DEBUG</key><0>ID84</0><1>Shell activated: 1069444718763 (438 x 500) [438 x 500]</1></message>
520  <message><key>%B_DEBUG</key><0>ID85</0><1>activate() for 1069444734716 (441 x 139) [441 x 139]</1></message>
521  <message><key>%B_DEBUG</key><0>ID86</0><1>Shell activated: 1069444734716 (441 x 139) [441 x 139]</1></message>
522  <message><key>%B_The_window_opens</key><0>ID87</0><1>Source Folder Added</1></message>
523  <message><key>%B_Click_button</key><0>ID88</0><1>Yes</1></message>
524  <message><key>%B_DEBUG</key><0>ID89</0><1>widgetDisposed: 1069444734716 (441 x 139) [441 x 139]</1></message>
525  <message><key>%B_The_window_closes</key><0>ID90</0><1>Source Folder Added</1></message>
526  <message><key>%B_DEBUG</key><0>ID91</0><1>Shell activated: 1069444718763 (438 x 500) [438 x 500]</1></message>
527  <message><key>%B_Field_set_to</key><0>ID92</0><1>Default output folder</1><2>MyServiceProject/bin</2></message>
528  <message><key>%B_Click_button</key><0>ID93</0><1>Finish</1></message>
529  <message><key>%B_DEBUG</key><0>ID94</0><1>widgetDisposed: 1069444718763 (438 x 500) [438 x 500]</1></message>
530  <message><key>%B_The_page_closes</key><0>ID95</0><1>Project name:</1></message>
531  <message><key>%B_The_window_closes</key><0>ID96</0><1>New Project</1></message>
532  <message><key>%B_DEBUG</key><0>ID97</0><1>Shell activated: 1069444592291 (1288 x 1004) [1288 x 1004]</1></message>
533  <message><key>%B_Menu_post_selection</key><0>ID98</0><1>File > New > Service Project</1></message>
534  <message><key>%B_end_sequence</key><0>ID99</0></message>
```

FIG. 5

Recorded Activity

| | |
|---|---|
| 601A | B_start_sequence= |
| 602A | B_end_sequence= |
| 603A | B_DEBUG= |
| 604A | B_Switch_to_the_xxx_perspective= |
| 605A | B_The_perspective_has_changed_to= |
| 606A | B_Switch_to_the_xxx_yyy_in_the_zzz_perspective= |
| 607A | B_Select_from_tree= |
| 608A | B_Default_from_tree= |
| 609A | B_Editor_closes_for= |
| 610A | B_Editor_opens_for= |
| 611A | B_Click_the_tabfolder_tab= |
| 612A | B_From_the_menu_select= |
| 613A | B_From_the_popup_menu_select= |
| 614A | B_The_window_opens= |
| 615A | B_The_page_opens= |
| 616A | B_The_page_closes= |
| 617A | B_The_window_closes= |
| 618A | B_Click_button= |
| 619A | B_Select_button= |
| 620A | B_Deselect_button= |
| 621A | B_Click_the_toolbar_icon= |
| 622A | B_Rightclick_the_toolbar_icon= |
| 623A | B_Select_from_table= |
| 624A | B_Default_from_table= |
| 625A | B_Set_field_value= |
| 626A | B_Field_set_to= |
| 627A | B_Click_the_ctabfolder_tab= |
| 628A | B_Select_from_combo= |
| 629A | B_Select_from_ccombo= |
| 630A | B_The_workbench_window_name_has_changed_to= |
| 631A | B_Unmonitored_control= |
| 632A | B_Click_canvas= |
| 633A | B_Click_clabel= |
| 634A | B_Click_label= |
| 635A | B_Click_styledtext= |
| 636A | B_Menu_post_selection= |
| 637A | B_Context_menu_post_selection= |
| 638A | B_Post_click_the_toolbar_icon= |
| 639A | B_Press_key= |
| 640A | B_Press_key_in= |
| 641A | B_Click_draw2d= |
| 642A | B_Base_Resource_touch= |
| 643A | B_Contained_Resource_touch= |
| 644A | B_From_the_list_select= |
| 645A | B_NOTE_TO_WRITER= |
| 646A | chapter= |
| 647A | section= |
| 648A | subsection= |
| 649A | subsubsection= |
| 650A | scriptname= |
| 651A | screencap= |
| 652A | imageTagOnly= |
| 653A | B_timestamp= |
| 654A | Direct_Insertion= |

FIG. 6A

Conversion

| | |
|---|---|
| 601B | <ol> |
| 602B | </ol> |
| 603B | *** DEBUG: {1} |
| 604B | <li>Switch to the <b>{1}</b> perspective. |
| 605B | <li>The perspective has changed to <b>{1}</b>. |
| 606B | <li>Switch to the {1} {2} in the <b>{3}</b> perspective. |
| 607B | <li>From the tree, {1} <b>{2}</b>. |
| 608B | <li>Accept the default value <b>{1}</b> from the tree. |
| 609B | <li>The editor closes for <b>{1}</b>. |
| 610B | The editor opens for <b>{1}</b>. |
| 611B | <li>Click the <b>{1}</b> (tabfolder) tab. |
| 612B | <li>From the menu, select <b>{1}</b>. |
| 613B | <li>From the popup menu, select <b>{1}</b>. |
| 614B | The <b>{1}</b> window opens. |
| 615B | The <b>{1}</b> page opens. |
| 616B | The <b>{1}</b> page closes. |
| 617B | The <b>{1}</b> window closes. |
| 618B | <li>Click <b>{1}</b>. |
| 619B | <li>Select <b>{1}</b>. |
| 620B | <li>Clear <b>{1}</b>. |
| 621B | <li>Click the <b>{1}</b> icon {3} on the {2} toolbar. |
| 622B | <li>Right-click the <b>{1}</b> icon {3} on the {2} toolbar. |
| 623B | <li>From the table, select <b>{1}</b>. |
| 624B | <li>Accept the default value <b>{1}</b> from the table. |
| 625B | <li>In the <b>{1}</b> field, type <samp>{2}</samp>. |
| 626B | <li>The field <b>{1}</b> will be set to <samp>{2}</samp>. |
| 627B | <li>Click the <b>{1}</b> tab. |
| 628B | <li>From the <b>{1}</b> combo, select <b>{2}</b>. |
| 629B | <li>From the <b>{1}</b> ccombo, select <b>{2}</b>. |
| 630B | <li>The workbench window name has changed to <b>{1}</b>. |
| 631B | <li>A control <b>{1}</b> (class is <b>{2}</b>) was clicked, but there is no shadow for it. |
| 632B | <li>{1} Click the canvas at location {2}. |
| 633B | <li>Click the custom label {1}. |
| 634B | <li>Click the label {1}. |
| 635B | <li>Click the styledText at location {1}. |
| 636B | <li>The menu item <b>{1}</b>, was selected. |
| 637B | <li>The popup menu item <b>{1}</b> was selected. |
| 638B | <li>The <b>{1}</b> icon on the {2} toolbar was clicked. |
| 639B | <li>Press the {1} key. |
| 640B | <li>Press the {1} key in the {2}. |
| 641B | <li>{1} click the <b>{2}</b> {3} on the {4}. |
| 642B | <li>The {1} <b>{2}</b> was {3}. |
| 643B | <li>The {1} <b>{2}</b> contained in {3} <b>{4}</b> was {5}. |
| 644B | <li>From the list, select <b>{1}</b>. |
| 645B | <li><b>Note to writer:</b> {1} |
| 646B | </ol><h1>{1}</h1><ol> |
| 647B | </ol><h2>{1}</h2><ol> |
| 648B | </ol><h3>{1}</h3><ol> |
| 649B | </ol><h4>{1}</h4><ol> |
| 650B | </ol><h5>{1}</h5><ol> |
| 651B | <br><br><img src=\"../{1}\" alt=\"{2}\" /><br><br> |
| 652B | <img src=\"../{0}\" alt=\"{1}\" /> |
| 653B | <h3><center>* * {1} * *</center></h3> |
| 654B | <li>{1}</li> |

FIG. 6B

| | | |
|---|---|---|
| 701 | 1. | From the menu, select File > New > Service Project. The New Project window opens. The Project name: page opens. |
| 702 | 2. | In the Project name field, type `MyServiceProject`. |
| 703 | 3. | The field Directory will be set to `Workspace/MyServiceProject`. |
| 704 | 4. | Click Next. The field Default output folder will be set to `MyServiceProject`. |
| 705 | 5. | Click Add Folder. The New Source Folder window opens. |
| 706 | 6. | In the Enter a path relative to '/MyServiceProject' field, type `src`. |
| 707 | 7. | Click OK. The Source Folder Added window opens. |
| 708 | 8. | Click Yes. |
| 709 | 9. | The field Default output folder will be set to `MyServiceProject/bin`. |
| 710 | 10. | Click Finish. |

FIG. 7

GRAPHICAL USER INTERFACE (GUI) SCRIPT GENERATION AND DOCUMENTATION

This application is a division of application number 10/860,413, filed Jun. 3, 2004, now U.S. Pat. No. 7,461,342 issued Dec. 2, 2008.

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to data processing systems and software, and more specifically to a method and system for GUI script generation, and a method and system for documentation of a GUI usage scenario.

As known in the art, GUI record/playback tools give a user the capability to capture the steps required to automatically recreate a GUI usage scenario. For example, the GUI record/playback tool may capture keystrokes, user responses, window responses, etc. in a GUI script, then automatically execute each recorded step by playing back the GUI script. Such tools are often useful in GUI application testing, development, and demonstrations.

A GUI application undergoing testing and development may go through numerous iterations before it is completed. After an amendment is made, creation of a new GUI script to test and demonstrate the GUI application as amended may be beneficial. However, creating a new GUI script from a live recording every time an amendment is made may be cumbersome and impractical.

As a closely related matter, when documenting a generated GUI script, there may be significant effort expended in having a scenario developer walk step-by-step through the GUI usage scenario, while a scenario writer makes detailed notes about each step. This manual documentation process can be very cumbersome and very time-consuming. Furthermore, if the GUI application undergoes further testing and development, the documentation may quickly become outdated, requiring the documentation effort to be repeated.

What is needed is a more effective and efficient way to generate a GUI script based on a GUI usage scenario. What is also needed is a more efficient way to generate documentation for a GUI usage session.

SUMMARY

There is provided a method and system for generating documentation for a GUI usage scenario. There is also provided a method and system for assembling a GUI script from a plurality of pre-scripted parts.

In an embodiment, a scenario developer may use a plurality of pre-scripted parts to assemble a GUI script based on a GUI usage scenario. The pre-scripted parts may be used repeatedly and interchangeably to assemble different GUI scripts. Optionally, if a pre-scripted part is not available, one may be created, and stored for later use. A pre-scripted part can be readily replaced to create a new version of a GUI script without having to perform a live recording of the entire GUI usage scenario.

In order to generate documentation for a GUI usage session (such as is provided by playback of a GUI script), a plurality of shadow objects may be created to listen to each GUI widget (e.g. GUI control) and shell (e.g. window) of interest. GUI widgets and shells are collectively referred to in the present description as GUI objects. Each shadow object may listen to and report any shadowed GUI object activities immediately, or may record details about the shadowed GUI object activities to be reported later, even if the shadowed GUI object ceases to exist.

Using a pre-determined list of GUI object activities and corresponding narrative language statements, a documentation generation module converts the activities reported by the shadow objects into human-readable documentation. The narrative language statements may optionally include formatting so that the resulting documentation is easier to read. Much of the manual effort previously required to create documentation is eliminated, and only minor editing may be required to put the documentation into a final form. Accuracy of the documentation may also be significantly improved, since the documentation generation is largely automated.

In an embodiment, after initial generation of the documentation, the scenario writer may use a screen capture tool during slowed playback of a GUI script to extract screen captures to enhance the documentation.

In an aspect of the invention, there is provided a method of generating documentation for a GUI usage session, including: (i) shadowing each GUI object of interest using a corresponding shadow object, each shadow object being configured to listen to and report activities of its corresponding shadowed GUI object; (ii) identifying each activity of interest reported by each shadow object using a pre-determined list of GUI object activities; (iii) converting each GUI object activity identified in (ii) into a predetermined narrative language statement; (iv) presenting narrative language statements converted in (iii) as human-readable documentation.

In an embodiment, the identifying in (ii) includes comparing a reported GUI object activity with an activity in the pre-determined list of GUI object activities.

In an embodiment, the converting in (iii) includes matching each activity in the pre-determined list of GUI object activities with a narrative language statement in a corresponding list of pre-determined narrative language statements.

In an embodiment, the pre-determined narrative language statements contain formatting. The formatting may be, for example, one of HTML, XML, and XHTML code.

In an embodiment, the presenting in (iv) includes displaying formatted narrative language statements corresponding to the GUI usage session.

In an embodiment, the GUI usage session is created by playback of a GUI script, and the method further includes replaying the GUI script together with the documentation for selectively embedding screen captures in the documentation.

In another aspect of the invention, there is provided a system for generating documentation for a GUI usage session, including: (a) a shadow manager for creating a plurality of shadow objects to shadow each GUI object of interest, each shadow object being configured to listen to and report activities of a corresponding shadowed GUI object; (b) a pre-determined list of GUI object activities containing each activity that may be reported by the plurality of shadow objects; (c) pre-determined narrative language statements corresponding to each activity in the pre-determined list of GUI object activities; (d) a documentation generation module for converting activities of interest reported by the plurality of shadow objects into human-readable documentation, using the pre-determined list of GUI object activities and the pre-determined narrative language statements.

In an embodiment, the narrative language statements in (c) further include formatting. The formatting may be, for example, one of HTML, XML, and XHTML code.

In an embodiment, a shadow object is configured to listen to and report an activity immediately. In another embodiment, a shadow object is configured to listen to and report an activity when polled.

In another aspect of the invention, there is provided a computer readable medium containing computer executable code for generating documentation for a GUI usage session, the computer executable code including: (a) code for shadowing each GUI object of interest using a corresponding shadow object, each shadow object being configured to listen to and report activities of its corresponding shadowed GUI object; (b) code for identifying each activity of interest reported by each shadow object using a pre-determined list of GUI object activities; (c) code for converting each activity identified in (b) into a pre-determined narrative language statement; (d) code for presenting narrative language statements converted in (c) as human-readable documentation.

In an embodiment, the code for identifying in (b) includes code for comparing a reported GUI object activity with an activity in the pre-determined list of GUI object activities.

In an embodiment, the code for converting in (c) includes code for matching each activity in the pre-determined list of widget and shell activities with a narrative language statement in a corresponding list of pre-determined narrative language statements.

In an embodiment, the pre-determined narrative language statements contain formatting language. The formatting language may be, for example, one of HTML, XML, and XHTML.

In an embodiment the code for presenting in (d) includes code for displaying formatted narrative language statements corresponding to the GUI usage session.

In an embodiment, the computer executable code further includes code for replaying the GUI script corresponding to the GUI usage session together with the documentation, and for selective embedding screen captures in the documentation.

In another aspect of the invention, there is provided a method of assembling a GUI script, including: (i) selecting a suitable pre-scripted part from a catalog of pre-scripted parts for assembling at least a portion of the GUI script, each pre-scripted part being configured to accept a parameter value in place of a recorded value; (ii) repeating (i) until all suitable pre-scripted parts are selected; (iii) generating a call script configured to call the suitable pre-scripted parts, the call script being further configured to pass suitable parameter values to the selected pre-scripted parts.

In an embodiment, the method further includes, before (iii): (iv) creating a new suitable pre-scripted part to accept a parameter value in place of a recorded value; (v) repeating (iv) until all suitable pre-scripted parts necessary to complete the GUI script are available. In an embodiment, the creating in (iv) comprises modifying a previously recorded GUI script.

In an embodiment, the method further includes replacing in the call script a pre-scripted part with another pre-scripted part to form a new version of the GUI script.

In an embodiment, the method further includes storing multiple versions of the GUI script for subsequent retrieval.

In another aspect of the invention, there is provided a system for assembling a GUI script, including: (a) a catalog of pre-scripted parts for assembling at least a portion of the GUI script, each pre-scripted part being configured to accept parameter values in place of recorded values; (b) a script execution module for generating a call script configured to call suitable pre-scripted parts to assemble at least a part of the GUI script, the call script being further configured to pass suitable parameter values to the suitable pre-scripted parts.

In an embodiment, the system further includes means for generating a new suitable pre-scripted part for the catalog.

In an embodiment, the script execution module is configurable to replace in the call script a pre-scripted part with another pre-scripted part to form a new version of the GUI script.

In an embodiment, the system further includes storage for storing multiple versions of the GUI script for subsequent retrieval.

In another aspect of the invention, there is provided a computer readable medium containing computer executable code for assembling a GUI script, the computer executable code including: (a) code for selecting a suitable pre-scripted part from a catalog of pre-scripted parts for assembling at least a portion of the GUI script, each pre-scripted part being configured to accept a parameter value in place of a recorded value; (b) code for repeating (a) until all suitable pre-scripted parts are selected; (c) code for generating a call script configured to call the suitable pre-scripted parts, the call script being further configured to pass suitable parameter values to the selected pre-scripted parts.

In an embodiment the computer executable code further includes: (d) code for creating a new suitable pre-scripted part to accept a parameter value in place of a recorded value; (e) code for repeating (d) until all suitable pre-scripted parts necessary to complete the GUI script are available. In an embodiment, the code for creating in (d) comprises code for modifying a previously recorded GUI script.

In an embodiment the computer executable code further includes code for replacing in the call script a pre-scripted part with another pre-scripted part to form a new version of the GUI script.

The foregoing and other aspects of the invention will be apparent from the following more particular descriptions of exemplary embodiments.

BRIEF DESCRIPTIONS OF THE DRAWINGS

In the figures which illustrate exemplary embodiments of the invention:

FIG. 3A shows an illustrative example of a recorded GUI script.

FIG. 3B shows an illustrative example of a "pre-scripted part" created from the GUI script of FIG. 3A, modified to accept various parameters.

FIG. 3C shows an illustrative example of a call script that can call the modified "pre-scripted part" form of the script of FIG. 3B.

FIG. 4A is a schematic flow chart of a method for creating the shadow objects in the UML model of FIG. 4.

FIG. 4C is a schematic flow chart of a method for setting the reporting mode of each shadow object depending on type.

FIG. 5 is an illustrative example of a generated GUI script.

FIG. 6A is an illustrative example of a pre-determined list of GUI activities.

FIG. 6B is an illustrative example of a list of narrative language statements corresponding to each activity listed in FIG. 6A (formatted for Hyper-Text Markup Language or HTML in this illustrative example).

FIG. 7 is an illustrative example of formatting and presentation of narrative language statements corresponding to the generated GUI script of FIG. 5.

FIG. 8A is a schematic flow chart of a detail of FIG. 8.

DETAILED DESCRIPTION OF EXEMPLARY EMBODIMENTS

Figure 1:
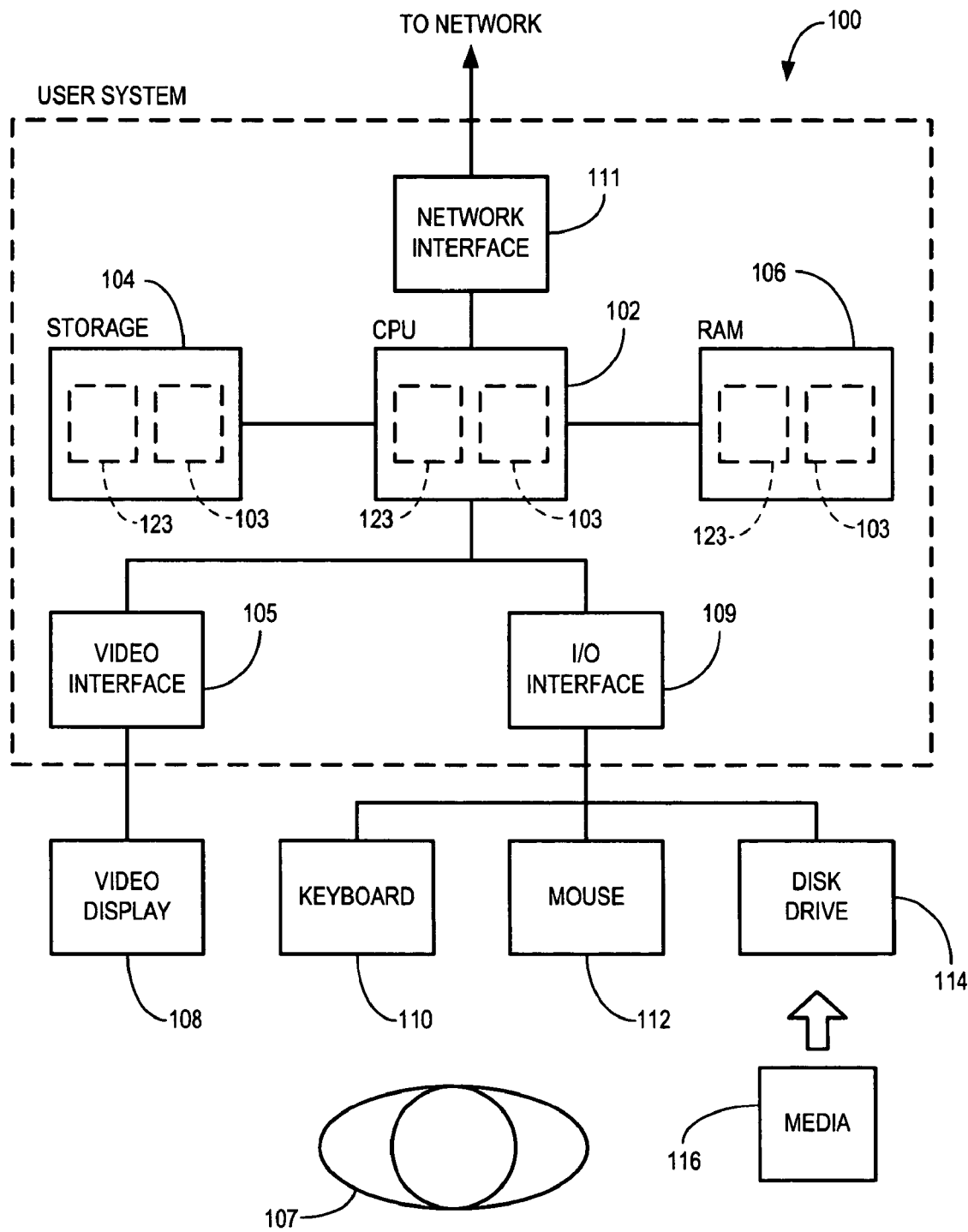
FIG. 1 shows an illustrative data processing system which may provide an operating environment for various exemplary embodiments.

FIG. 1 shows an illustrative data processing system 100 that may provide an operating environment for exemplary embodiments of the invention. The data processing system 100 may include a central processing unit ("CPU") 102 connected to a storage unit 104 and to a random access memory ("RAM") 106. The CPU 102 may execute an operating system 101, and a plurality of software applications 103. The operating system 101 and applications 103 may be stored in the storage unit 104 and loaded into RAM 106, as required. A user 107 may interact with the data processing system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the data processing system 100 may be network enabled via a network interface 111.

It will be appreciated that the data processing system 100 of FIG. 1 is merely illustrative and is not meant to be limiting in terms of the type of system that might provide a suitable operating environment for the invention. As an illustrative example, the data processing system 100 may run an Eclipse Integrated Development Environment (IDE) platform.

Figure 2:
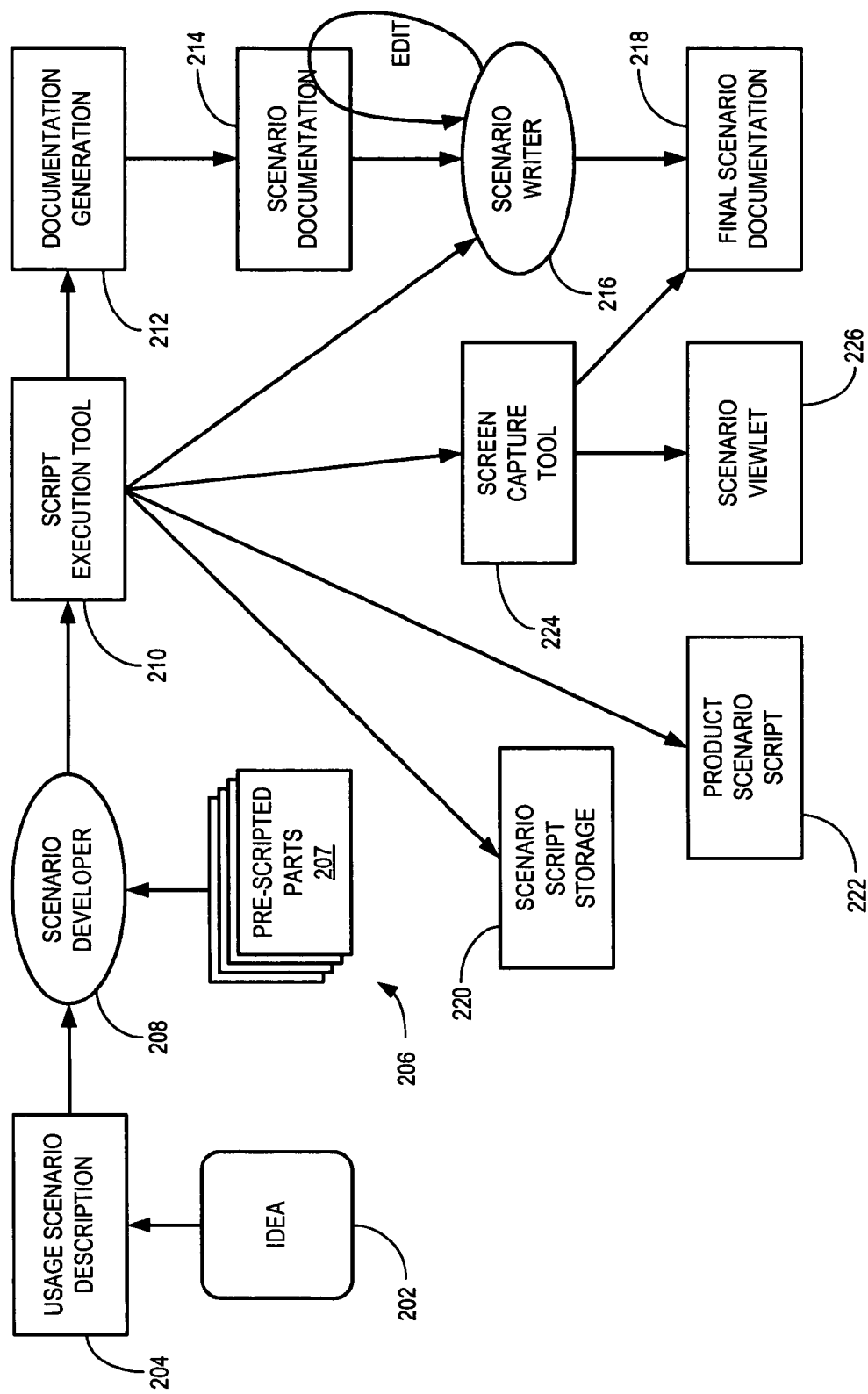
FIG. 2 shows a schematic block diagram of a system for generating a GUI script and for generating documentation, in accordance with an embodiment of the invention.

FIG. 2 shows a schematic block diagram of a system for generating a GUI script and for generating documentation for the same, in accordance with an exemplary embodiment of the invention. The embodiment is first described generally with respect to FIG. 2, and detailed further below, with reference to subsequent figures.

As shown in FIG. 2, an idea for a GUI application represented schematically at 202 is first developed into a GUI usage scenario description at block 204. The GUI usage scenario 204 is then developed into an actual GUI script which implements the GUI usage scenario (for the given application environment). By way of example, the data processing system 100 of FIG. 1, running an Eclipse platform, may embody such an application environment, and the GUI script may be implemented to run in that application environment.

In an embodiment, the GUI script corresponding to the GUI usage scenario 204 may be generated by assembling pre-scripted parts 207 from a catalog 206. The pre-scripted parts 207 may be stored, for example, in storage unit 104 and copied to RAM 106 as necessary to be used by a software application running on the Eclipse platform to assemble the GUI script. In an embodiment, each pre-scripted part 207 may be configured to accept parameter values, such that the pre-scripted part 207 may be used for any number of situations where the GUI usage actions are the same, but the individual parameter values are different. If a particular pre-scripted part 207 is not available in the catalog 206, a scenario developer 208 may optionally create the required new pre-scripted part 207.

In an embodiment, a new pre-scripted part 207 may be created by recording a live GUI usage session using a GUI record/playback tool, and editing the resulting GUI script into a more generalized and reusable form. By way of example, the Rational® XDE Tester may be used to record a live GUI usage session running on the Eclipse platform. The live GUI recording is performed as directed by the recording tool's documentation, and the content of that recording is examined, looking for content that will vary from one use of the GUI action to another. Such values are candidates for parameterization, and the recorded GUI script is edited such that those values are passed as parameters from higher-level controlling call scripts.

As a specific example, consider a "raw" GUI script recorded using Rational XDE Tester shown in FIG. 3A (lines 230-243). By way of illustration, the GUI script recording has captured a simple GUI usage session in which a tree is expanded into a new view. As shown at line 240, a tree is expanded by clicking the RIGHT mouse button. Here, the path to a file to be opened is provided as a string "SomeProject->src->com.example->MyFile.java". In this string, there are a number of values that may change from one usage of the GUI script to another (i.e. the particulars of the file, folder, etc.).

Now referring to FIG. 3B, shown is an illustrative example of an amended "pre-scripted part" (e.g. a new pre-scripted part 207 in FIG. 2) corresponding to the recorded GUI script in FIG. 3A. More specifically, line 240 of FIG. 3A has been replaced by a general purpose version of the script "OpenFile" with various string parameters defined at lines 240a-240d in FIG. 3B. Line 240e defines a string separator "->" used by Rational XDE Tester to separate the string parameters at lines 240a-240d. Lines 240f-240k define a string variable, fullPath, in terms of the parameters defined in lines 240a-240d. At line 240m, the path to the file as expressed in line 240 of FIG. 3A has been replaced by the string variable, fullPath.

Now referring to FIG. 3C, shown is an illustrative example of a controlling call script that, together with the illustrative pre-scripted part shown in FIG. 3B, may replace the recorded GUI script in FIG. 3A. More generally, the call script of FIG. 3C can call the new pre-scripted part in FIG. 3B using a callScript ( ) command. In this illustration, the callScript ( ) command is used to call the new general purpose script "OpenFile" with specific values for the parameters defined at lines 240a-240d in FIG. 3B.

As will be appreciated, by replacing the recorded values in the recorded script of FIG. 3A with variables passed through parameters, the function performed by the script in FIG. 3A has been generalized, and the new pre-scripted part of FIG. 3B (i.e. a new pre-scripted part 207 of FIG. 2) may be stored in a catalog (i.e. catalog 206 of FIG. 2) for later use by the scenario developer 208.

In an embodiment, the scenario developer 208 may use a script execution module 210 to generate/assemble the GUI script. The script execution module 210 may be embodied, for example, as another application 103 running on an Eclipse platform on the data processing system of FIG. 100. As will be appreciated, a substantially complete catalog 206 of pre-scripted parts 207 may make the task of assembling the GUI script significantly easier for the scenario developer 208.

In order to generate documentation for the GUI script generated by the scenario script development/execution tool 210, a documentation generation module 212 may be used to listen to the effect of the playback of the GUI script. (In an alternative embodiment, the documentation module 212 may listen to a live GUI usage session, although the repeatability and rapid development of the GUI script from one iteration to the next may be lost in that case.) The documentation generation module 212 may be embodied, for example, as another software application 103 running in another instance of the Eclipse platform on the data processing system 100 of FIG. 1.

In an embodiment, the documentation generation module 212 may create suitable shadow objects to listen to each GUI widget and shell (i.e. each GUI object) of interest, either as a GUI script is played back, or by listening directly to a live GUI usage session. As will be explained in detail further below, with reference to FIGS. 4 and 4A-4D, each shadow object may listen to and report details about a corresponding shadowed GUI object (e.g. GUI widget or shell) activities. As discussed below, these shadow objects may be created and discarded dynamically during the course of a GUI usage session, in order to shadow each and every GUI object of interest. The use of shadow objects allows details of GUI object activities to be recorded which may otherwise be lost (e.g. when listening to a GUI widget which terminates abruptly and details about that widget also disappear simultaneously).

Using such shadow objects, the documentation generation module 212 may convert a raw GUI script, or alternatively a live GUI usage session, into narrative language statements describing the shadowed GUI object activity. (An illustrative example of this conversion process is provided further below, with reference to FIGS. 5, 6A, 6B and 7.)

The resulting generated GUI scenario documentation 214 contains narrative language statements describing the activities of shadowed GUI objects in human-readable form. A scenario writer 216 may then edit the generated GUI scenario documentation 214 as desired to produce a final version of the documentation 218.

Referring back to the script execution module 210, once a GUI script has been developed, the GUI script may be stored in scenario script storage 220 for subsequent retrieval. This scenario script storage 220 allows previously generated GUI scripts to be retrieved and further amended as necessary, and may also provide a history of amendments, allowing backtracking to an earlier version if necessary.

In an embodiment, the script execution module 210 may be used to generate a product scenario script 222. Based on the GUI usage scenario 204, a full set of GUI scripts and supporting code may be generated and copied over to another system, such as a customer's computer system, to be executed. This may make GUI application development significantly easier since samples showing how the GUI usage scenario may be turned into a GUI script may serve as a valuable teaching tool, as well as a useful precedent for modification.

In an embodiment, the scenario writer 216 may control a screen capture tool 224 to capture screen shots for enhancing the scenario documentation 218. The screen capture tool 224 may be used, for example, by playing back a GUI script together with a corresponding GUI scenario documentation 214. When the playback is slowed down sufficiently, the scenario writer 216 has time to see that a particular screen shot is of interest, then captures the screen shot of interest using the screen capture tool 224. Thus, the resulting scenario documentation 218 may be enhanced by suitable screen captures at relevant places in the documentation.

In an embodiment, the screen capture tool 224 may also be used to create simplified "show me" demonstrations of portions of the GUI script. These show me demonstrations may be viewed by an end-user using a scenario viewlet 226 available, for example, via a "help" screen for the GUI application. Show me demonstrations may provide a set of relevant screen captures to show an end-user the information to be entered and where to enter it, providing a simple tutorial that may be more convenient than written instructions.

Figure 4:
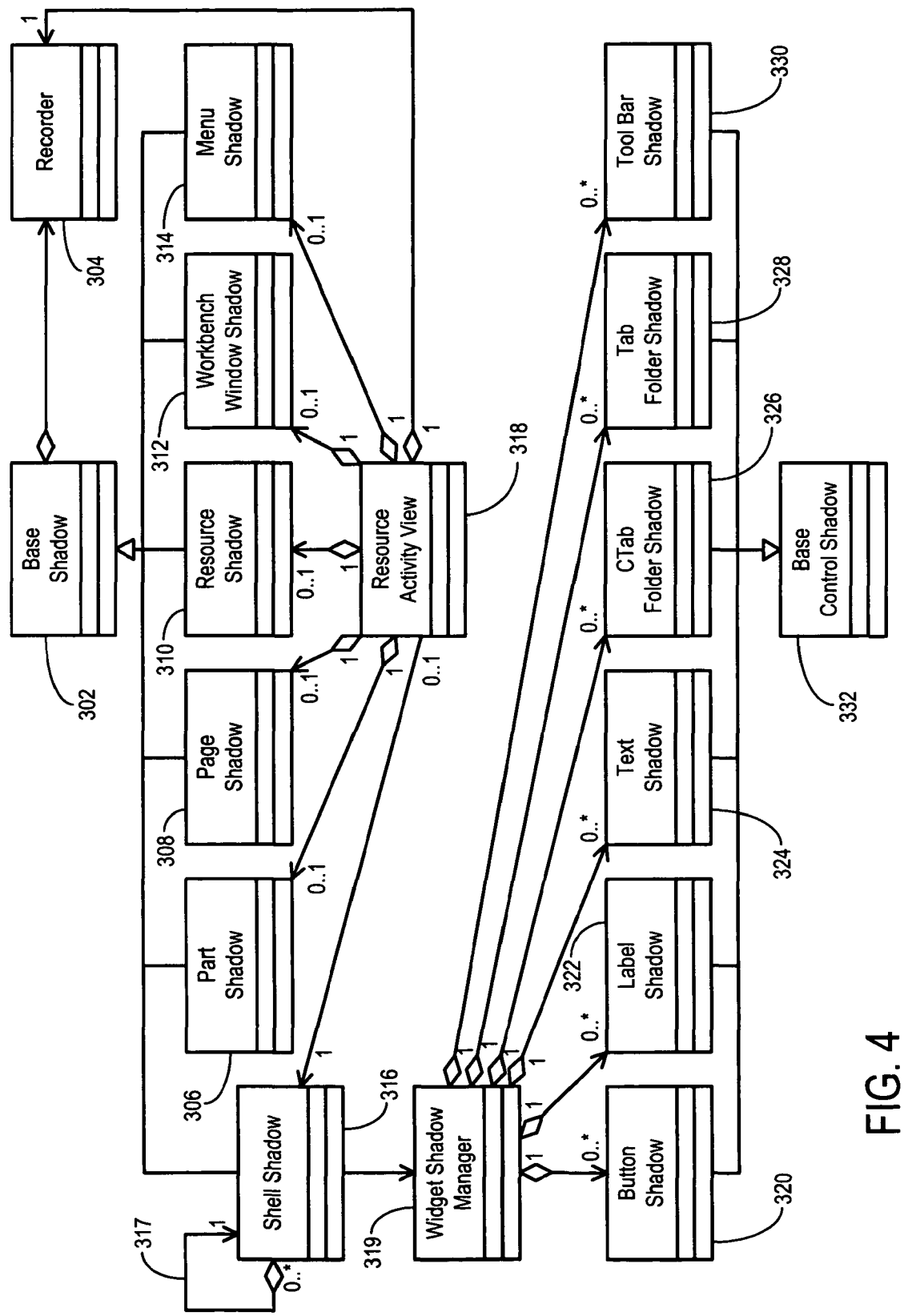
FIG. 4 shows a schematic Unified Modeling Language (UML) model of an illustrative set of shadow objects which may be used in generating documentation, in accordance with an illustrative embodiment of the invention.

Now referring to FIG. 4, shown is a UML model of an illustrative set of shadow objects that may be created to listen to various widgets and shells of interest. In an embodiment, the documentation generation module 212 may create these shadow objects. As shown, the UML model of FIG. 4 includes a base shadow class 302, and a recorder class 304 assigned to the base shadow class 302. A plurality of shadow classes 306-314 are children of the base shadow class 302. (It will be appreciated that each shadow "object" as referenced elsewhere in the present description may be instantiated from a shadow "class" as described here.) The base shadow class 302 also has a generalization relationship with a shell shadow class 316, which is also a child of class 302. The shell shadow class 316 is associated with and listens to a corresponding shell or window of the GUI application of interest. A self-reference line 317 from the shell shadow class 316 onto itself indicates that other shell shadow classes may be instantiated to handle any other shells (e.g. pop-up windows) that may be created.

Each of the set of shadow classes 306-314 are also members of a resource activity view class 318. The resource activity view class 318 is associated with the shell shadow class 316 and is the root for the shadow classes of interest. The resource activity view class 318 is thus able to monitor all widget activities occurring within a shell shadow class 316.

For example, when a user opens the resource activity view, various high-level objects are created, including a recorder instantiated from the recorder class 304. The resource activity view listens to the recorder for reported GUI object activities.

As shown, associated with each shell shadow 316 is a widget shadow manager 319. The widget shadow manager 319 has a set of shadow classes 320-330 typically associated with various shell widgets, such as buttons, labels, text, and so on. Each of these shadow classes 320-330 are also children of a base control shadow class 232, which exists separately from the base shadow class 302 for programming convenience.

It will be appreciated by those skilled in the art that the various shadow classes shown in FIG. 4 are merely representative, and are not meant to be exhaustive in terms of the type of widget and shell activities that may be shadowed. Furthermore, it will be appreciated that variations of the UML model shown in FIG. 4 are possible, without departing from the general concept of creating shadow objects to listen to each GUI object (e.g. GUI widget or shell) of interest.

FIG. 4A is a schematic flow chart of an illustrative method 400A for creating some of the shadow objects according to the UML model of FIG. 4. More specifically, method 400A begins at block 404, where the recorder 304 of FIG. 4 is created. Method 400A then proceeds to block 406 at which the part shadow 306 is created. Continuing on, the page shadow 308 is created at block 408, the resource shadow 310 is created at block 410, the work bench window shadow 312 is created at block 412, and the menu shadow 314 is created at block 414. Method 400*a* then proceeds to block 416 to create a shell shadow 316 to monitor the main shell (e.g. the main Eclipse platform workbench window). Method 400*a* then ends. All shadow objects created by method 400*a* will continue to exist for as long as the workbench window is active. Once the workbench ends, the shadows no longer exist, and may be recreated by restarting the workbench and repeating method 400A.

It will be appreciated that method 400A is merely an example of an illustrative set of shadow objects that may be created. In alternative embodiments, as many shadow objects as are required to listen to all widgets of interest in the shell may be created in a corresponding manner.

Figure 4B:
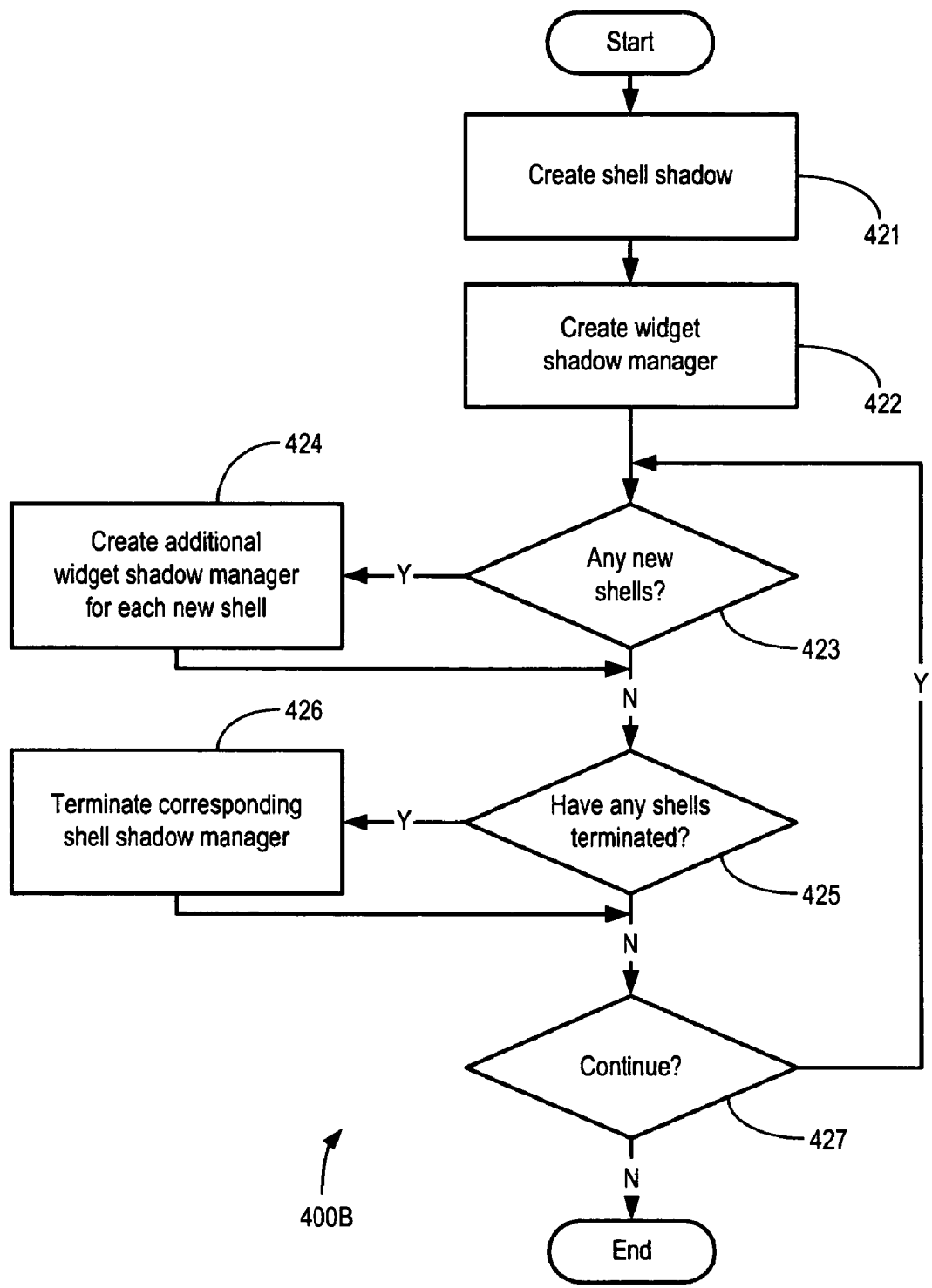
FIG. 4B is a schematic flow chart of a method for creating shell shadows in the UML model of FIG. 4.

FIG. 4B is a schematic flow chart of a method 400B for creating a widget shadow manager (e.g. widget shadow manager 319 of FIG. 4) for each shell that may be created. More specifically, method 400B begins at block 421 by creating a shell shadow (e.g. shell shadow class 316 of FIG. 4) for the primary shell or window. Method 400B then creates a widget shadow manager (e.g. widget shadow manager 319 of FIG. 4) for that shell at 422. Method 400B then proceeds to decision block 423, where method 400B determines whether any additional shells (e.g. pop-up windows) have been created. If yes, method 400B proceeds to block 424, where an additional widget shadow manager is created for each new shell. Method 400B then proceeds to decision block 425. If no, method 400B proceeds directly to decision block 425 to determine if any shells have terminated (e.g. a pop-up window has closed). If yes, method 400B proceeds to block 426 where any corresponding widget shadow managers and their contained widget shadows are also terminated, possibly after polling them for activity. Method 400B then loops back to decision block 423 from decision block 427 for as long as the shadow managers continue to be required. Otherwise, method 400B ends.

FIG. 4C is a schematic flow chart of a method 400C for setting the type of monitoring to be done by each shadow object. Method 400C begins at decision block 431, where method 400*c* determines whether a new widget is identified. If yes, method 400C proceeds to block 432, where the type of widget is identified. (If no, method 400C ends.) Method 400C then proceeds to block 434 where, depending on the type of widget, a corresponding shadow object is created and either set to listen to and report all widget activity immediately, or set to listen to the widget activity and report only when polled. Method 400C then loops back to decision block 431 and repeats until no new widgets are identified.

As an illustrative example, a type of widget activity that may be reported immediately is a user clicking on a button on the GUI. A corresponding button shadow object may immediately report the activity, as clicking the button may initiate an immediate action or response that could change the environment. The type of widget activity that is reported only when polled may be, for example, user entry of a series of characters in a text field. In such a case, rather than separately reporting each character typed by the user, a corresponding text shadow object listening to that text field may store all the characters typed, then wait for a subsequent triggering event (e.g. pressing the enter key, or clicking a button) which causes the text shadow object to report the typed characters. For example, the triggering of this reporting may come from the widget shadow manager as a result of other activities taking place (e.g. a button click as outlined above).

Figure 4D:
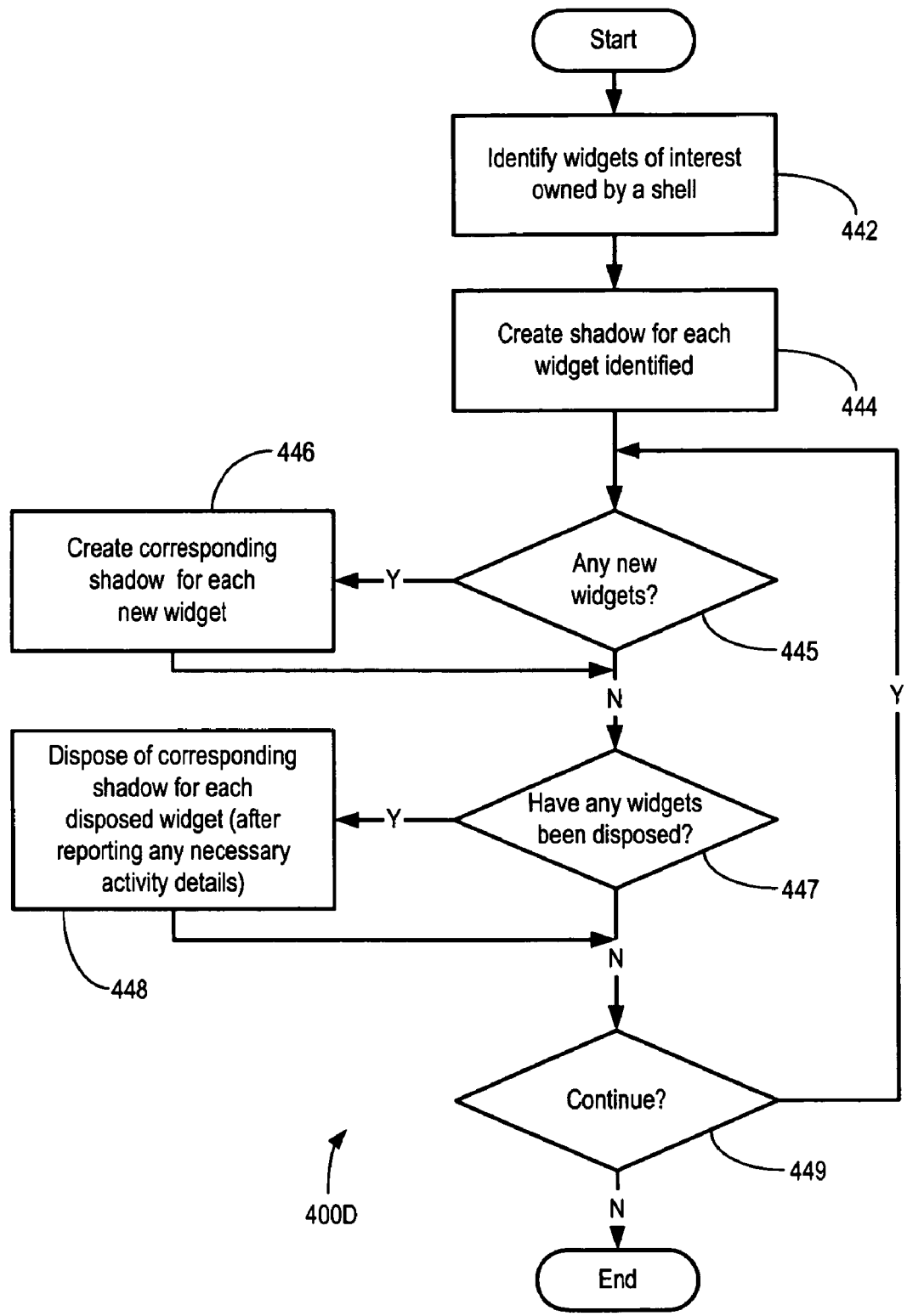
FIG. 4D is a schematic flow chart of a method for identifying all widgets of interest in a shell, and for creating corresponding shadow objects.

FIG. 4D is a schematic flow chart of a method for identifying all widgets of interest in a shell (e.g. a window), and creating a corresponding set of shadow objects for those widgets. More specifically, method 400D begins at block 442, where all widgets of interest within a shell (i.e. a window) are identified. By way of example, on the Eclipse platform, the widgets may be identified as being from the Standard Widget Toolkit (SWT). Method 400D then proceeds to block 444, where method 400D creates a shadow object to listen to each widget identified at block 442. In an embodiment, there is one instance of a shadow object created for each instance of a widget (e.g. three buttons will result in three button shadows). Method 400D then proceeds to decision block 445, where method 400D determines whether there are any new widgets that have been added to the shell referred to at block 442. If yes, method 400D proceeds to block 446 where a corresponding shadow object may be added for each new widget. If no, method 400D proceeds directly to decision block 447. Method 400D then proceeds to decision block 447, where method 400D determines whether any widget of interest currently being shadowed has been disposed or terminated. If yes, method 400D proceeds to block 448, where the corresponding shadow object may also be disposed (after reporting any necessary activity details for documentation). If no, method 400D proceeds directly to decision block 449. Method 400D then loops back to block 445 from decision block 449, until the documentation generation module 212 is terminated by the user. Method 400D then ends. As will be appreciated from this illustrative example, shadow objects may be dynamically created and disposed to shadow widgets of interest within a shell. While a method 400D for one shell has been shown, it will be appreciated that method 400D may be readily modified to accommodate multiple shells, or to apply to another shell, in a corresponding manner.

While method 400C and method 400D have been presented separately for the sake of illustration, it will be observed that the methods may overlap during actual use.

Now referring to FIG. 5, shown is an illustrative example of the GUI object activities reported by the shadow objects. The GUI script begins at line 501 with a "B_start_sequence" activity (shown in boldface in FIG. 5 for the purposes of illustration). The GUI script ends at line 534 with a "B_end_sequence" activity (again shown in boldface in FIG. 5 for the purposes of illustration). The recording shown at lines 501-534 is in its "raw" form, as generated using a script execution module (e.g. script execution module 210 of FIG. 2). As will now be explained, each "activity" in FIG. 5 may be identified and converted into a narrative language statement, such that much of the effort previously required to generate documentation for a GUI script may be eliminated.

Referring to FIG. 6A, shown is an illustrative pre-determined list of activities which may be generated in a GUI script, within a particular application environment. For example, at line 601A of FIG. 6A, the activity "B_start_sequence" boldfaced at line 501 in FIG. 5 is shown. At line 602A of FIG. 6A, the activity "B_end_sequence" boldfaced at line 534 of FIG. 5 is shown. Lines 603A-654A represent other types of activities that may be found in a GUI script. It will be observed that the illustrative GUI script shown in FIG. 5 uses only a subset of the activities listed in FIG. 6A.

Now referring to FIG. 6B, shown is a list of narrative language statements and formatting code corresponding to each of the GUI object activities listed in FIG. 6A. In the present illustrative example, the narrative language statements are formatted according to HTML, such that the statements can be readily formatted and displayed as an HTML page. Thus, as shown at line 601B, the "B_start_sequence" activity listed on Line 601A of FIG. 6A is converted simply to the HTML code "<ol>". Also, the activity "B_end_sequence"

at line 602A of FIG. 6A is converted simply to HTML code "</ol>" at line 602B. Lines 603B-654B provide formatted narrative language statements (formatted using HTML in the present illustrative example) corresponding to each of the activities listed at lines 603A-654A of FIG. 6A.

While the pre-determined list of GUI object activities in FIG. 6A is shown separately from the corresponding list of narrative language statements in FIG. 6B for the purposes of illustration, it will be appreciated that there may be a single list contained in a single file, or the conversion information may be alternatively stored in a relational database.

While the narrative language statements are formatted according to HTML for the purposes of illustration, it will be appreciated that, in alternative embodiments, virtually any desired type of formatting may be used, such as XML, XHTML, and so on.

Now referring to FIG. 7, shown at lines 701-710 is an illustrative example of GUI scenario documentation 214 with formatted narrative language statements generated from the "raw" recording of GUI object activities in FIG. 5, using the conversion list on FIG. 6A and FIG. 6B. This GUI scenario documentation 214 may then be edited by the scenario writer 216 (FIG. 2) to generate a final form of the scenario documentation 218 (FIG. 2).

Figure 8:
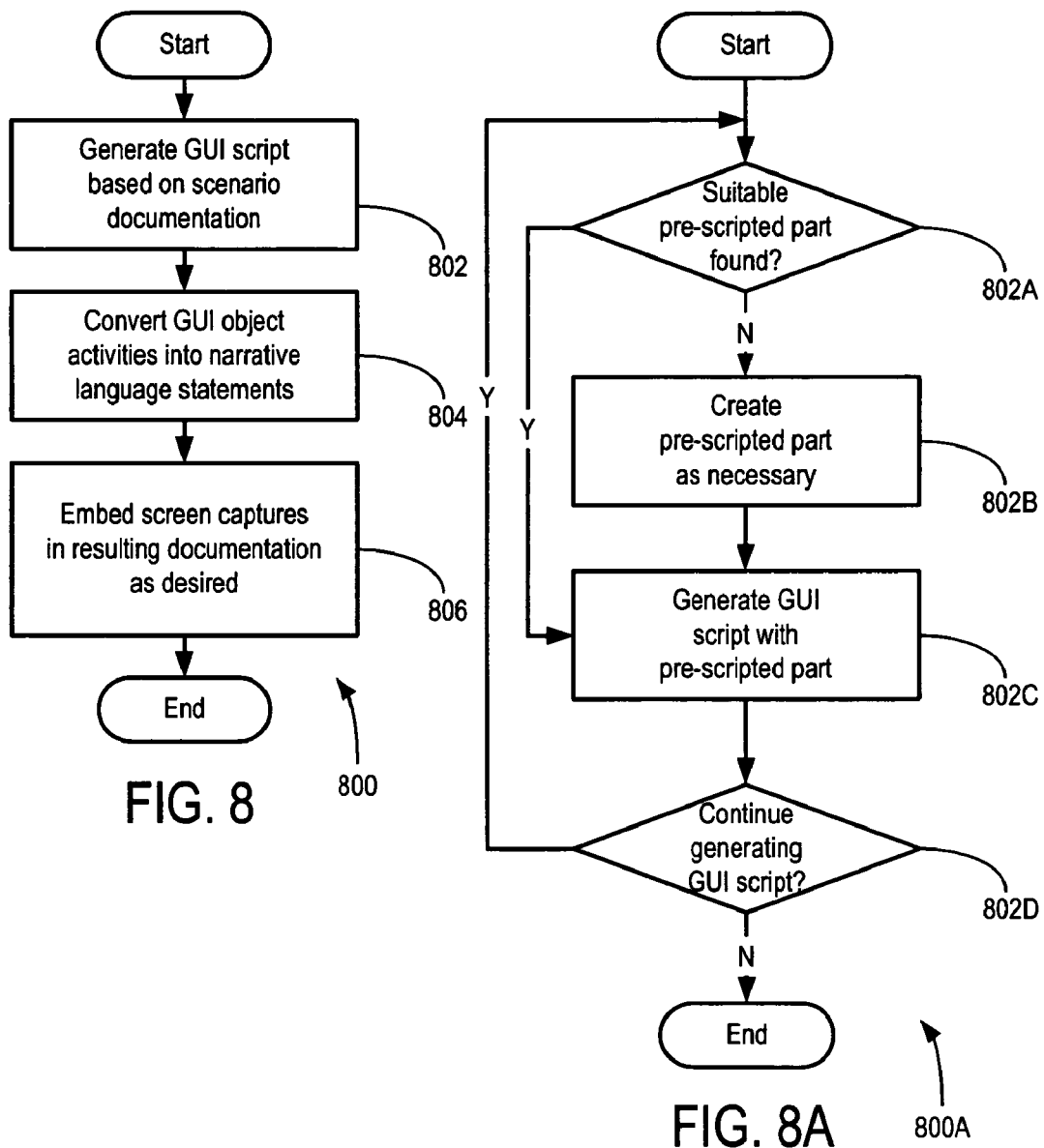
FIG. 8 is a schematic flow chart of a method for generating a GUI script and for generating documentation, in accordance with an illustrative embodiment of the invention.

Now referring to FIG. 8, shown is a schematic flow chart of an exemplary method 800 in accordance with an embodiment of the invention. More specifically, method 800 begins at block 802, where a GUI script based on a GUI usage scenario description (e.g. usage scenario 204 of FIG. 2) is generated. In one embodiment, as detailed in FIG. 8A, the GUI script may be assembled from pre-scripted parts (e.g. pre-scripted parts 207 from catalog 206 of FIG. 2). However, in another embodiment, the GUI script may be recorded directly from a live GUI usage session following the GUI usage scenario description.

Method 800 then proceeds to block 804, where the raw recording of a GUI usage session is converted (e.g. by documentation generation tool 212 of FIG. 2) into narrative language statements in a scenario script (e.g. GUI scenario documentation 214 of FIG. 2). Block 804 is described in further detail below with respect to FIG. 8B.

Method 800 then proceeds to block 806, where screen captures may be embedded in the GUI scenario documentation 214 by the scenario writer 216. Block 806 is described in further detail below with respect to FIG. 8C. Method 800 then ends.

Now referring to method 800A in FIG. 8A, method 800A begins at block 802A, where pre-scripted parts, as previously described, may be used to assemble a GUI script based on a GUI usage scenario description. In an embodiment, the pre-scripted parts may be available from a catalog of such parts, as previously described. Method 800A then proceeds to decision block 802B where, if a required pre-scripted part is not found, then method 800A proceeds to block 802C where the required scripted part is created, as previously described. Method 800A then loops back to block 802A from decision block 802D, until the GUI script is completely assembled. Method 800A then ends.

Now referring to method 800A in FIG. 8A, method 800A begins at decision block 802A, where method 800A determines if a suitable pre-scripted part has been found. If yes, method 800A proceeds to block 802C where, as previously described, the suitable pre-scripted part may be used to assemble a GUI script based on a GUI usage scenario description. In an embodiment, the pre-scripted parts may be available from a catalog of such parts, as previously described. If a suitable pre-scripted part is not found, method 800A proceeds to block 802B where the required scripted part is created, as previously described. Method 800A then proceeds to block 802C where the new pre-scripted part may be used to assemble the GUI script. Method 800A then loops back to decision block 802A from decision block 802D, until the GUI script is completely assembled. Method 800A then ends.

Figures 8B, 8C:
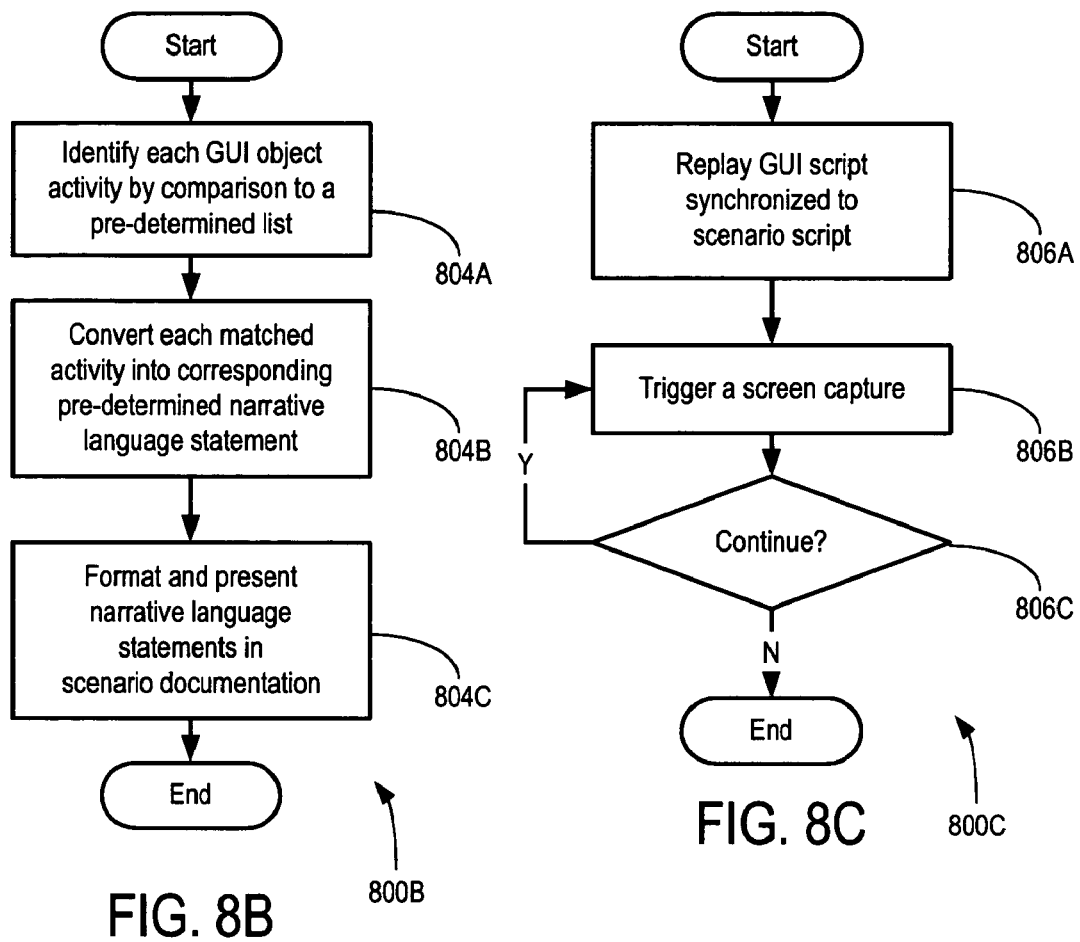
FIG. 8B is a schematic flow chart of another detail of FIG. 8.
FIG. 8C is a schematic flow chart of yet another detail of FIG. 8.

Now referring to method 800C in FIG. 8C, method 800C begins at block 806A, where the assembled GUI script is played back at a slower speed. During playback of the GUI script, a scenario writer (e.g. scenario writer 216 of FIG. 2) may trigger a screen capture, as shown at block 806B, for subsequent inclusion into the script. Method 800C loops back to block 806B from decision block 806C until the scenario writer 216 completes enhancing the resulting scenario documentation (e.g. scenario documentation 218 of FIG. 2). Method 800C then ends.

As will be appreciated, the embodiments described above are merely illustrative, and variations and modifications may become apparent to those skilled in the art after reading the description. For example, while the above embodiment describes assembling a GUI script using a catalog of pre-scripted parts, it will be apparent that the automatic documentation generation may be performed equally effectively on a GUI script generated from a "live" GUI recording session, or from a "live" interaction between the user and the subject GUI.

Furthermore, while the Eclipse platform has been described as one possible environment in which the present invention may be practiced, it will be apparent that the teachings of the present invention may extend to virtually any application development environment in which it is necessary to record a script, and to accurately document that script in an efficient manner.

Also, it will be apparent to those skilled in the art that the teachings of the present invention may be embodied in a computer executable program, which may be stored on a computer readable medium.

Therefore, the scope of the invention is limited only by the language of the following claims.

What is claimed is:

1. A method of assembling a graphical user interface script, comprising:

a computer selecting a set of pre-scripted parts from a catalog of pre-scripted parts for assembling at least a portion of the graphical user interface script, wherein each pre-scripted part in the set of pre-scripted parts is configured to accept parameter values in place of recorded values, one or more of the pre-scripted parts in the set of pre-scripted parts used in a plurality of situations, and the one or more pre-scripted parts performing graphical user interface usage actions that are the same for each of the plurality of situations and use different parameter values for each of the plurality of situations; and the computer assembling portion of the graphical user interface script by generating in the graphical user interface script a call to each pre-scripted part in the set of pre-scripted parts, wherein each call is configured in the graphical user interface script to pass the parameter values that each pre-scripted part is configured to accept.

2. The method of claim 1 wherein the set of pre-scripted parts for the portion of the graphical user interface script is a first set, and further comprising:

the computer creating a second set of pre-scripted parts necessary to complete the graphical user interface script; and the computer adding the second set of pre-scripted parts to the first set of pre-scripted parts prior to the computer assembling the portion of the graphical user interface script, wherein in adding the second set of pre-scripted parts to the first set of pre-scripted parts the graphical user interface script assembled by the computer is further configured to call all of the pre-scripted parts necessary to complete the graphical user interface script.

3. The method of claim 2, wherein the computer creating the second set of pre-scripted parts necessary to complete the graphical user interface script comprises modifying a previously recorded graphical user interface script.

4. The method of claim 1, wherein the computer assembling the portion of the graphical user interface script by generating in the graphical user interface script the call to each pre-scripted part in the set of pre-scripted parts includes replacing in the graphical user interface script a pre-scripted part with another pre-scripted part to form a new version of the graphical user interface script.

5. The method of claim 4, further comprising storing multiple versions of the graphical user interface script for subsequent retrieval.

6. A system for assembling a graphical user interface script, comprising:
- one or more processor units, one or more memories, and one or more computer-readable storage devices;
- program instructions, stored on at least one of the computer readable storage devices for execution by at least one processor unit via at least one memory, to:
  - select a set of pre-scripted parts from a catalog of pre-scripted parts for assembling at least a portion of the graphical user interface script, wherein each pre-scripted part in the set of pre-scripted parts is configured to accept parameter values in place of recorded values, one or more of the pre-scripted parts in the set of pre-scripted parts used in a plurality of situations, and the one or more pre-scripted parts performing graphical user interface usage actions that are the same for each of the plurality of situations and use different parameter values for each of the plurality of situations; and
  - assemble the portion of the graphical user interface script by generating in the graphical user interface script a call to each pre-scripted part in the set of pre-scripted parts, wherein each call is configured in the graphical user interface script to pass the parameter values that each pre-scripted part is configured to accept.

7. The system of claim 6, further comprising program instructions, stored on the storage device for execution by the processor unit via the memory, to generate a new pre-scripted part for the catalog.

8. The system of claim 6, wherein assembling the portion of the graphical user interface script by generating in the graphical user interface script the call to each pre-scripted part in the set of pre-scripted parts includes replacing in the graphical user interface script a pre-scripted part with another pre-scripted part to form a new version of the graphical user interface script.

9. The system of claim 8, further comprising storage for storing multiple versions of the graphical user interface script for subsequent retrieval.

10. A computer readable storage medium containing computer executable code for assembling a graphical user interface script, said computer executable code comprising:
- code for selecting a a set of pre-scripted parts from a catalog of pre-scripted parts for assembling at least a portion of the graphical user interface script, wherein each pre-scripted part in the set of pre-scripted parts is configured to accept parameter values in place of recorded values, one or more of the pre-scripted parts in the set of pre-scripted parts used in a plurality of situations, and the one or more pre-scripted parts performing graphical user interface usage actions that are the same for each of the plurality of situations and use different parameter values for each of the plurality of situations; and
- code for assembling the portion of the graphical user interface script by generating in the graphical user interface script a call to each pre-scripted part in the set of pre-scripted parts, wherein each call is configured in the graphical user interface script to pass the parameter values that each pre-scripted part is configured to accept.

11. The non-transitory computer readable medium of claim 10 wherein the set of pre-scripted parts for the portion of the graphical user interface script is a first set, and further comprising:
- code for creating a second a second set of pre-scripted parts necessary to complete the graphical user interface script; and
- code for adding the second set of pre-scripted parts to the first set of pre-scripted parts prior to the code for assembling the portion of the graphical user interface script, wherein in adding the second set of pre-scripted parts to the first set of pre-scripted parts the graphical user interface script is further configured to call all of the pre-scripted parts necessary to complete the graphical user interface script.

12. The non-transitory computer readable medium of claim 10, wherein the code for creating the second set of pre-scripted parts necessary to complete the graphical user interface script comprises code for modifying a previously recorded graphical user interface script.

13. The non-transitory computer readable medium of claim 10, wherein the code for assembling the portion of the graphical user interface script by generating in the graphical user interface script the call to each pre-scripted part in the set of pre-scripted parts includes code for replacing in the graphical user interface script a pre-scripted part with another pre-scripted part to form a new version of the graphical user interface script.

* * * * *